US012734983B2

(12) United States Patent
Baumann

(10) Patent No.: US 12,734,983 B2
(45) Date of Patent: Sep. 15, 2026

(54) SUPPLYING POWER TO A LV ONBOARD ELECTRICAL SUBSYSTEM OF A VEHICLE FROM THE HV ONBOARD ELECTRICAL SUBSYSTEM THEREOF

(71) Applicant: Bayerische Motoren Werke Aktiengesellschaft, Munich (DE)

(72) Inventor: Martin Baumann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/862,211

(22) PCT Filed: Apr. 6, 2023

(86) PCT No.: PCT/EP2023/059258

§ 371 (c)(1),
(2) Date: Nov. 1, 2024

(87) PCT Pub. No.: WO2023/217470

PCT Pub. Date: Nov. 16, 2023

(65) Prior Publication Data

US 2025/0289386 A1 Sep. 18, 2025

(30) Foreign Application Priority Data

May 12, 2022 (DE) ..................... 10 2022 111 868.1

(51) Int. Cl.
*B60R 16/033* (2006.01)
*B60L 50/60* (2019.01)
*H02M 1/36* (2007.01)

(52) U.S. Cl.
CPC ............ *B60R 16/033* (2013.01); *B60L 50/60* (2019.02); *H02M 1/36* (2013.01); *B60L 2210/12* (2013.01)

(58) Field of Classification Search
CPC .... B60R 16/033; B60L 50/60; B60L 2210/12; H02M 1/36
See application file for complete search history.

(56) References Cited

U.S. PATENT DOCUMENTS 9,729,055 B1 * 8/2017 Yao ....................... H02M 3/156
10,005,453 B2 * 6/2018 Kraska .................... B60L 50/16

(Continued)

FOREIGN PATENT DOCUMENTS

DE 10 2011 084 006 A1 4/2013
DE 10 2013 015 713 A1 3/2015
DE 11 2014 000 545 T5 11/2015

OTHER PUBLICATIONS

Baumann M. et al., "Deadzone Compensated Double Integral Sliding Mode Control for Distributed Converters" IEEE Transportation Electrification Conference & Expo (ITEC), Jun. 21-25, 2021 (6 pages).

(Continued)

*Primary Examiner* — Menatoallah Youssef
*Assistant Examiner* — Esayas G Yeshaw
(74) *Attorney, Agent, or Firm* — Crowell & Moring LLP

(57) ABSTRACT

A method for supplying power to a low-voltage (LV) onboard electrical subsystem of a vehicle from the high-voltage (HV) onboard electrical subsystem thereof via at least one DC voltage converter with an adjustable current saturation value, wherein an auxiliary voltage that is between a nominal voltage of the HV onboard electrical subsystem and a specified minimal input voltage is set; when an input voltage measured at the DC voltage converter falls below the value of the auxiliary voltage, an associated input power is determined; a power-adapted value of the current saturation is calculated on the basis of the previously determined input power, and is set instead of a standard value of the current saturation; and the current saturation is reset to (Continued)

the standard value only when the input voltage again reaches the nominal voltage of the HV onboard electrical subsystem.

20 Claims, 2 Drawing Sheets

(56) References Cited

U.S. PATENT DOCUMENTS

2015/0043111 A1 2/2015 Koch et al.
2015/0372606 A1 12/2015 Tamura et al.
2020/0122584 A1* 4/2020 Zhang .................. B60W 10/30
2021/0086660 A1 3/2021 Verdier et al.
2021/0252990 A1* 8/2021 Wang ...................... B60L 53/22
2022/0285955 A1* 9/2022 Koo .................... H02M 1/0025

OTHER PUBLICATIONS

International Search Report (PCT/ISA/210) issued in PCT Application No. PCT/EP2023/059258 dated Jul. 3, 2023 with English translation (5 pages).
German-language Written Opinion (PCT/ISA/237) issued in PCT Application No. PCT/EP2023/059258 dated Jul. 3, 2023 with English translation (9 pages).
German-language Search Report issued in German Application No. 10 2022 111 868.1 dated Jan. 23, 2023 with partial English translation (10 pages).

* cited by examiner

SUPPLYING POWER TO A LV ONBOARD ELECTRICAL SUBSYSTEM OF A VEHICLE FROM THE HV ONBOARD ELECTRICAL SUBSYSTEM THEREOF

BACKGROUND AND SUMMARY

The invention relates to a method for supplying power to a LV onboard electrical subsystem of a vehicle from the HV onboard electrical subsystem thereof by way of at least one electrically isolated DC-DC voltage converter. The invention also relates to a vehicle comprising an onboard energy system having a HV onboard electrical subsystem and a LV onboard electrical subsystem between which at least one electrically isolated DC-DC voltage converter is connected, the vehicle being configured to carry out the method. The invention is in particular advantageously applicable to electric vehicles.

M. Baumann, Yue Sun, Bert Haj Ali, C. Weissinger, H. Herzog: Deadzone Compensated Double Integral Sliding Mode Control for Distributed Converters, IEEE Transportation Electrification Conference & Expo (ITEC), Jun. 21-25, 2021, discloses a design method for so-called double integral sliding mode control (DISMC) that is applied to topologies derived from down converters. The control strategy based on so-called voltage mode control, VMC, is expanded by deadzone compensated current control in order to stabilize fault states such as short circuits. A control concept for decentralized converters is derived and verified by way of testbed-based measurements. DISMC is validated on a prototype 1 kW converter and compared with industry-standard PI-based control designs. Both settling time and overshoot amplitudes can be reduced by up to 67% or 35%.

It is an object of the present invention to overcome the disadvantages of the prior art at least in part and in particular to provide a more secure supply of power to a LV onboard electrical subsystem without a chemical LV store from a HV onboard electrical subsystem of a vehicle.

This object is achieved in accordance with the features of the present disclosure. Preferred embodiments can also be found in the present disclosure.

The object is achieved by a method for supplying power to a LV onboard electrical subsystem of a vehicle from the HV onboard electrical subsystem thereof by way of at least one electrically isolated DC-DC voltage converter with an adjustable value of the current saturation, $I_{out,max}$, in which at the DC-DC voltage converter

- an auxiliary voltage, $V_{in,th}$, that lies between a nominal voltage, $V_{in,nom}$, of the HV onboard electrical subsystem and a predefined minimum input voltage, $V_{in,min}$, is stipulated,
- when an input voltage, $V_{in}$, measured at the DC-DC voltage converter drops below the value of the auxiliary voltage $V_{in,th}$ an input power, $P_{in}$, at the DC-DC voltage converter is ascertained and
- a "power-adapted" value, $I_{out,max|red}$, of the current saturation is computed on the basis of the previously ascertained input power and is set instead of a standard value of the current saturation, and
- the current saturation $I_{out,max}$ is reset to the default or standard value $I_{out,max|def}$ only when the input voltage $V_{in}$ again reaches the nominal voltage $V_{in,nom}$ of the HV onboard electrical subsystem.

This method results in the advantage that the supply of power to the low-voltage onboard energy system can be provided even if the source has limited power (for example an aged high-voltage battery, increased impedance of the HV onboard electrical subsystem, etc.). This is achieved as a result of the current saturation $I_{out,max}$ being adapted according to the determined input power on the basis of a hysteresis. This allows the LV onboard electrical subsystem to be supplied with a low voltage even when the HV-side input voltage $V_{in}$ at the DC-DC voltage converter is low.

The low-voltage (LV) onboard electrical subsystem has a nominal onboard electrical system voltage that is lower than the nominal onboard electrical system voltage $V_{in,nom}$ of the high-voltage (HV) onboard electrical subsystem.

The electrically isolated DC-DC voltage converter is a DC-DC voltage converter whose input side, which is connected to the HV onboard electrical subsystem, is electrically isolated from the output side, which is connected to the LV onboard electrical subsystem. The electrical isolation may be implemented in a fundamentally known manner by way of opposite input-side and output-side coils having respective numbers of turns. There is therefore a turns ratio n for the DC-DC voltage converter. The input voltage $V_{in}$ applied to the input side can be measured by the DC-DC voltage converter itself.

The vehicle may be a motor vehicle having an internal combustion engine, a plug-in hybrid vehicle, PHEV, or a fully electrically operated vehicle, BEV, for example. The vehicle may be a passenger car, a truck, a motorcycle, an aircraft (airplane, helicopter, etc.), a watercraft (boat, ship, etc.) or a combination of these.

The current saturation $I_{out,max}$ corresponds in particular to the current value that can be fed into the LV onboard electrical subsystem by the output side of the respective DC-DC voltage converter. The value of the current saturation $I_{out,max}$ is in particular adjustable by the DC-DC voltage converter itself. The standard value can correspond to the maximum current value that can be output based on the design, for example.

In particular, it holds that $V_{in,nom}>V_{in,th}>V_{in,min}$.

The circumstance that when the input voltage $V_{in}$ drops below the value of the auxiliary voltage $V_{in,th}$ the input power $P_{in}$ at the DC-DC voltage converter is ascertained and a new, "power-adapted" current saturation value $I_{out,max|red}$ is computed and is set instead of the standard current saturation value $I_{out,max|def}$ involves, in particular, in this scenario, which typically exists when there are no transients, it first holding that and it further holding that $I_{out,max}=I_{out,max|def}$. Only when, e.g. if a transient occurs, $V_{in}$ drops below the value of the auxiliary voltage $V_{in,th}$ is $I_{out,max}$ switched over to $I_{out,max|red}$, $I_{out,max|red}$ being dependent on the input voltage $P_{in}$ present at the time at which the drop below the value is detected and typically being less than $I_{out,max|def}$, that is to say $I_{out,max|red}$ $(P_{in})<I_{out,max|def}$. The DC-DC voltage converter then leads to lower loading of the HV onboard electrical subsystem. The input voltage $V_{in}$ dropping below the value of the auxiliary voltage $V_{in,th}$ may—depending on the design—be consistent with the relationship $V_{in}<V_{in,th}$ or with the relationship $V_{in}\leq V_{in,th}$.

The current saturation $I_{out,max}$ being reset to the standard value $I_{out,max|def}$ only when the input voltage $V_{in}$ again reaches the nominal voltage $V_{in,nom}$ of the HV onboard electrical subsystem is consistent with a hysteresis of the value of the current saturation $I_{out,max}$ in the range between $V_{in,th}$ and $V_{in,nom}$. Thus, if the input voltage $V_{in}$ is between $V_{in,th}$ and $V_{in,max}$, the present value for $I_{out,max}$ is maintained. The input voltage $V_{in}$ again reaching the nominal voltage $V_{in,nom}$ of the HV onboard electrical subsystem may—depending on the design—be consistent with the relationship $V_{in}\geq V_{in,nom}$ or with the relationship $V_{in}>V_{in,nom}$.

One development is that the input power $P_{in}=V_{in}\cdot I_{in}$, where $I_{in}$ is the electric current flowing through the DC-DC voltage converter on the input side, is computed. Ignoring the power loss from the DC-DC voltage converter, this input power corresponds to the output power $V_{out}\cdot I_{out}$ on the output side of the DC-DC voltage converter. The input power $P_{in}$ can thus also be computed on the basis of the relationship $V_{out}\cdot I_{out}$ with or without considering the power loss from the DC-DC voltage converter.

One refinement is that the DC-DC voltage converter switches off when the input voltage $V_{in}$ drops below the predefined minimum input voltage $V_{in,min}$ (i.e., depending on the implementation, it holds that $V_{in}\leq V_{in,min}$ or $V_{in}<V_{in,min}$), and the DC-DC voltage converter switches on again when the input voltage $V_{in}$ again reaches the minimum input voltage $V_{in,min}$ (i.e., depending on the implementation, it holds that $V_{in}>V_{in,min}$ or $V_{in}\geq V_{in,min}$).

The DC-DC voltage converter switching off involves, in particular, it switching off its converter functionality and thus outputting no signal on the output side. Analogously, the DC-DC voltage converter switching on involves, in particular, it switching on its converter functionality. Other functions and/or components of the DC-DC voltage converter, such as its monitoring of the input voltage, the detection of when various threshold values are reached and the subsequent reaction (e.g. switching the converter functionality off and on), remain unaffected thereby, in particular.

One refinement is that the LV onboard electrical subsystem is supplied with power from the HV onboard electrical subsystem by multiple DC-DC voltage converters. This results in the advantage that comparatively simple and inexpensive DC-DC voltage converters can be used and moreover a particularly high level of failsafety and therefore supply security for the supply of power to the LV onboard electrical subsystem is achieved. The method is particularly advantageous for this refinement because it prevents circulating currents between the distributed DC-DC voltage converters or at least markedly reduces the effects thereof. These circulating currents otherwise lead to losses and can additionally damage the DC-DC voltage converters. This is because during transient loading the input voltages $V_{in}$ at the nodes of the individual DC-DC voltage converters may be different, or the total power of DC-DC voltage converters arranged in the vehicle in a distributed manner can exceed the supply power of the HV onboard electrical subsystem. In the latter case, a DC-DC voltage converter can then switch off if $V_{in}$ drops below $V_{in,min}$. This DC-DC voltage converter switches on again immediately afterwards if $V_{in}$ again reaches the value $V_{in,min}$. The connected DC-DC voltage converter then supplies the LV onboard electrical subsystem with power again, and the available system power of the HV onboard electrical subsystem is exceeded. Fresh disconnection and connection would then follow without further measures, which, with further repetitions, leads to heavy loading of the electronics of the DC-DC voltage converters, which in the worst case can even become damaged. This loading of the electronics is avoided by adapting the current saturation value as described above.

One development is that the above method is carried out independently for each of the DC-DC voltage converters. This is advantageous because the input voltages $V_{in}$ of the individual DC-DC voltage converters may be different, for example when transients occur. One development is that the input voltage $V_{in}$ applied to the DC-DC voltage converters is individually ascertained for each of the DC-DC voltage converters. This also results in the DC-DC voltage converters being individually switched on and switched off.

One refinement is that the minimum input voltage $V_{in,min}$ is computed in accordance with $V_{in,min}=n\cdot V_{out,ref}$, where n is a turns ratio of the DC-DC voltage converter and $V_{out,ref}$ is a reference control voltage. The reference (control) voltage corresponds in particular to a target controlled variable of the DC-DC voltage converter across the output-side terminals thereof. It can be set on the vehicle and thus e.g. adapted to different requirement scenarios. It may generally be higher, lower or the same as the nominal voltage of the LV onboard electrical subsystem.

One refinement is that the reference voltage $V_{out,ref}$ is exchanged between the DC-DC voltage converters on a data line, in particular on a CAN bus. This results in the advantage of simple adaptation of the reference voltage $V_{out,ref}$ over multiple converters and, by way of example, is also implementable in practice because this adaptation is not time-critical within typical transmission times of a bus.

One refinement is that the power-adapted current saturation value $I_{out,max|red}$ is computed in accordance with $I_{out,max|red}=P_{in}\cdot n/V_{in,th}$.

One refinement is that the DC-DC voltage converter is a synchronous rectifier. This results in the advantage that comparatively low losses occur. This type of rectifier typically involves no components being used that inherently permit a flow of current only in one direction; instead, MOSFETs are frequently used, which are controlled by drive electronics of the DC-DC voltage converter in such a way that they act as semiconductor diodes with very low forward voltage.

One development is that the synchronous rectifier is a push-pull forward converter with full-bridge drive. One refinement is that the synchronous rectifier is a phase shifted full bridge DC-DC voltage converter. Such a converter is particularly well suited even for higher power classes up to several kilowatts.

The rectifier may, in particular, be of similar design to the rectifier described in FIG. 1(a) of the article "Deadzone Compensated Double Integral Sliding Mode Control for Distributed Converters".

One refinement is that the nominal voltage $V_{in,nom}$ of the HV onboard electrical subsystem is between 48 V and 1000 V. One refinement is that the nominal voltage $V_{NV,nom}$ of the LV onboard electrical subsystem is between 12 V and 60 V. It generally holds that the nominal voltage of the HV onboard electrical subsystem is higher than the nominal voltage of the LV onboard electrical subsystem. Possible examples include $V_{in,nom}$=48 V, 60 V or 120 V and $V_{NV,nom}$=12 V; $V_{in,nom}$=120 V, 400 V or 800 V and $V_{NV,nom}$=48 V or 60 V; etc.

The object is also achieved by a vehicle comprising an onboard energy system having a HV onboard electrical subsystem and a LV onboard electrical subsystem between which at least one electrically isolated DC-DC voltage converter is connected, the vehicle being configured to carry out the method as described above. The vehicle may be in a similar form to the method, and vice versa, and has the same advantages.

As such, in one refinement, the vehicle may be a partially or fully electrically driven electric vehicle, e.g. a plug-in hybrid vehicle or electric-battery vehicle.

The properties, features and advantages of this invention that have been described above and the way in which they are achieved will become clearer and more distinctly comprehensible in connection with the schematic description below of an exemplary embodiment that is explained in more detail in connection with the drawings.

DETAILED DESCRIPTION OF THE DRAWINGS

Figure 1:
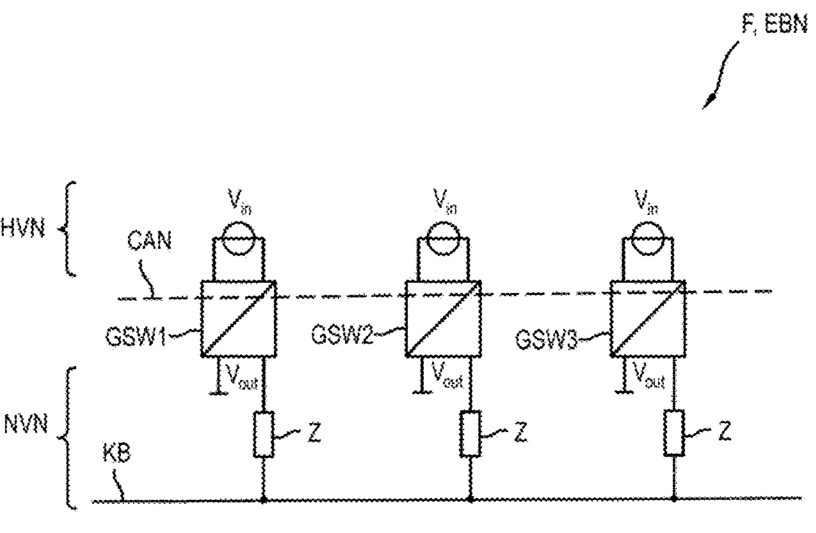
FIG. 1 shows an outline of a detail from an onboard energy system of a vehicle.

FIG. 1 shows an outline of a detail from an onboard energy system EBN of a vehicle F. The onboard energy system EBN has a LV onboard electrical subsystem LVN that can be supplied with power from an HV onboard electrical subsystem HVN by way of, here, multiple electrically isolated DC-DC voltage converters GSW1, GSW2, GSW3. The DC-DC voltage converters GSW1, GSW2, GSW3 convert a higher voltage $V_{in}$ of the HV onboard electrical subsystem HVN into a lower voltage $V_{out,ref}$. A respective output voltage $V_{out}$ of the DC-DC voltage converters GSW1, GSW2, GSW3 is applied to a wiring harness KB of the LV onboard electrical subsystem LVN, optionally via respective resistors Z, which may be identical or different.

The DC-DC voltage converters GSW1, GSW2, GSW3 are connected to a communication channel of the vehicle F, here e.g. a CAN bus CAN, and can use this to communicate with one another. In particular, the DC-DC voltage converters GSW1, GSW2, GSW3 may be in a master-slave arrangement, with e.g. the DC-DC voltage converter GSW1 being used as a master and the DC-DC voltage converters GSW2, GSW3 being used as slaves.

A desired value of the reference voltage $V_{out,ref}$ of the LV onboard electrical subsystem can be communicated to the DC-DC voltage converters GSW1, GSW2, GSW3 e.g. via the CAN bus CAN.

Figure 2:
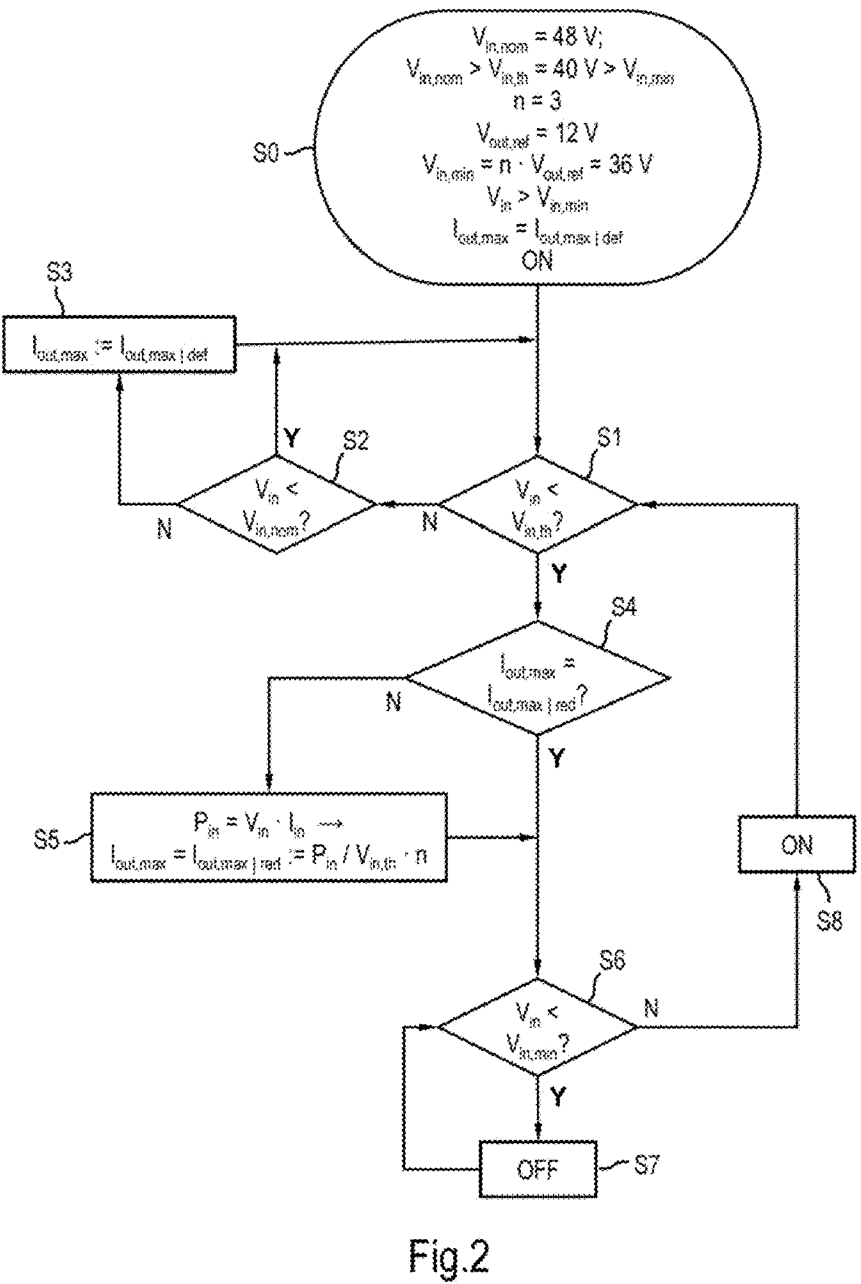
FIG. 2 shows a possible sequence of the method according to the present disclosure.

FIG. 2 shows a possible flow of a method for supplying power to the LV onboard electrical subsystem LVN from the HV onboard electrical subsystem HVN on the basis of an adaptation of one of the DC-DC voltage converters GSW1, GSW2 or GSW3. It holds that

- the nominal voltage $V_{in,nom}$ of the HV onboard electrical subsystem HVN is higher than the nominal voltage of the LV onboard electrical subsystem LVN;
- an auxiliary voltage $V_{in,th}$ has been predefined that lies between the nominal voltage $V_{in,nom}$ of the HV onboard electrical subsystem HVN and the predefined minimum input voltage $V_{in,min}$ of the HV onboard electrical subsystem HVN;
- a standard or default value of the current saturation $I_{out,max}$ is $I_{out,max|def}$.

In the present case, the following values are assumed, purely by way of illustration, for the further description of the method: $V_{in,nom}$=48 V, $V_{in,th}$=40 V, $V_{NV,nom}$ and $V_{out,ref}$=12 V and n=3. It follows that $V_{in,min}$=n. $V_{NV,nom}$=12 V=36 V. It also holds that $V_{in,nom}>V_{in,th}>V_{in,min}$. Furthermore, it will be assumed that at the beginning of the method, in step S0, there are no transients or other disturbances and the DC-DC voltage converters GSW1, GSW2, GSW3 are switched on, this being described by their state "ON". The input voltage $V_{in}$ is initially above the auxiliary voltage $V_{in,th}$ of 40 V.

After the start of the method in step S0, a step S1 comprises testing whether the input voltage $V_{in}$ is lower than the auxiliary voltage $V_{in,th}$. This is not normally the case ("N") in a healthy HV onboard electrical subsystem HVN with no transients, in which case a step S2 then comprises enquiring whether the input voltage $V_{in}$ is lower than the nominal voltage $V_{in,nom}$ of the HV onboard electrical subsystem HVN of 48 V. If this is the case ("Y"), the method branches back to step S1.

If, however, step S1 establishes that the input voltage $V_{in}$ is lower than the auxiliary voltage $V_{in,th}$ ("Y"), that is to say it holds that $V_{in}<V_{in,th}$, a step S4 comprises testing whether the current saturation $I_{out,max}$ is set to the power-adapted value $I_{out,max|red}$. If this is not the case ("N") and the current saturation $I_{out,max}$ is thus still at the standard value $I_{out,max|def}$, the method branches to step S5.

Step S5 comprises computing a currently available input power $P_{in}=V_{in}\cdot I_{in}$ on the input side of the DC-DC voltage converter GSW1, GSW2, GSW3 and, therefrom, a power-adapted current saturation value $I_{out,max}=I_{out,max|red}:=(n\cdot P_{in})/V_{in,th}$, which is now set on this DC-DC voltage converter GSW1, GSW2, GSW3 instead of the standard value $I_{out,max|def}$. It typically holds that $I_{out,max|red}<I_{out,max|def}$, and so a maximum power transfer from the HV onboard electrical subsystem HVN to the LV onboard electrical subsystem LVN via the DC-DC voltage converter GSW1, GSW2 or GSW3 and thus also overall is lowered. The method then transitions to step S6.

If step S4 receives a positive response ("Y"), however, i.e. the current saturation $I_{out,max}$ is already set to a power-adapted value $I_{out,max|red}$, the method branches directly to step S6. This approach thus involves the power-adapted current saturation value $I_{out,max|red}$, once set, being maintained without alteration until it is reset back to the standard value $I_{out,max|def}$.

Step S6 then comprises checking whether the input voltage $V_{in}$ is even lower than the minimum input voltage $V_{in,min}$, that is to say whether it holds that $V_{in}<V_{in,min}$.

If this is the case ("Y"), the DC-DC voltage converter GSW1, GSW2 or GSW3 under consideration is individually switched off in step S7, this being indicated by the switching state "OFF".

After said DC-DC voltage converter has been switched off, the method branches back to step S6 and the associated enquiry is made again. As a result, the DC-DC voltage converter GSW1, GSW2 or GSW3 under consideration remains switched off until the input voltage $V_{in}$ becomes greater than or equal to the minimum input voltage $V_{in,min}$ again ("N"). In this case or if the first test in step S6 has already established that the input voltage $V_{in}$ is greater than or equal to the minimum input voltage $V_{in,min}$, the method branches to step S8.

In step S8, the DC-DC voltage converter GSW1, GSW2 or GSW3 under consideration remains or becomes switched on, and the method branches back to step S1.

If the value of the input voltage $V_{in}$ in step S1 continues to be lower than the auxiliary voltage $V_{in,th}$ ("Y"), the method again branches to step S4. Since the power-adapted current saturation value $I_{out,max|red}$ is still set, the method branches from step S4 directly ("Y") to step S6.

If, however, the value of the input voltage $V_{in}$ in step S1 is greater than or equal to the auxiliary voltage $V_{in,th}$ ("N"), step S2 comprises a fresh test to ascertain whether the input voltage $V_{in}$ is lower than the nominal voltage $V_{in,nom}$ of the HV onboard electrical subsystem HVN. If this is the case ("Y"), the present power-adapted current saturation value $I_{out,max|red}$ is maintained and the method branches back to step S1.

Only if the value of the input voltage $V_{in}$ has again reached the nominal voltage $V_{in,nom}$ ("N") is the current saturation $I_{out,max}$ reset, or returned, to the standard value $I_{out,max|def}$.

It goes without saying that the present invention is not limited to the exemplary embodiment shown.

As such, there may also be only one DC-DC voltage converter GSW1, only two DC-DC voltage converters GSW1, GSW2 or more than three DC-DC voltage converters GSW1, GSW2, GSW3.

Furthermore, there is the general possibility, and for example in steps S1, S2 and/or S6 in the exemplary embodiment, of the conditions "less than or equal to" or "greater than" being tested instead of the conditions "less than" or "greater than or equal to".

In general, "a", "an", etc. can be understood to mean a singularity or a plurality, in particular in the sense of "at least one" or "one or more", etc., unless this is explicitly ruled out, e.g. by way of the expression "precisely one", etc.

It is also possible for a numerical statement to include precisely the indicated number and a customary tolerance range, unless this is explicitly ruled out.

LIST OF REFERENCE SIGNS

CAN CAN bus
EBN onboard energy system
F vehicle
KB wiring harness
GSW1 DC-DC voltage converter
GSW2 DC-DC voltage converter
GSW3 DC-DC voltage converter
$I_{in}$ input-side current through the DC-DC voltage converter
HVN HV onboard electrical subsystem HVN
$I_{out,max}$ current saturation
$I_{out,max|def}$ standard value of the current saturation
$I_{out,max|red}$ power-adapted value of the current saturation
n turns ratio
LVN LV onboard electrical subsystem
OFF off state
ON on state
P input power
S0-S8 method steps
$V_{in}$ measured input voltage
$V_{in,min}$ minimum input voltage
$V_{in,nom}$ nominal voltage of the HV onboard electrical subsystem
$V_{out,ref}$ reference voltage
$V_{in,th}$ auxiliary voltage

The invention claimed is:

1. A method for supplying power to a low-voltage (LV) onboard electrical subsystem (LVN) of a vehicle from a high-voltage (HV) onboard electrical subsystem (HVN) of the vehicle via at least one electrically isolated DC-DC voltage converter having an adjustable value of a current saturation representing a maximum output current that the at least one electrically isolated DC-DC voltage converter can output to the low-voltage onboard electrical subsystem, the method comprising:

stipulating an auxiliary voltage that lies between a nominal voltage of the HV onboard electrical subsystem and a predefined minimum input voltage;

ascertaining an associated input power in response to an input voltage measured at an input of the at least one DC-DC voltage converter dropping below a value of the auxiliary voltage;

computing a power-adapted value of the current saturation for the maximum output current of the at least one electrically isolated DC-DC voltage converter on a basis of a previously ascertained input power, and setting the computed power-adapted value of the current saturation for the maximum output current of the at least one electrically isolated DC-DC voltage converter instead of a standard value of the current saturation for the at least one electrically isolated DC-DC voltage converter; and resetting the current saturation for the least one electrically isolated DC-DC voltage converter to the standard value in response to the input voltage again reaching the nominal voltage of the HV onboard electrical subsystem.

2. The method according to claim 1, comprising:

switching off the at least one DC-DC voltage converter in response to the input voltage dropping below the minimum input voltage; and switching on the at least one DC-DC voltage converter in response to the input voltage again reaching the minimum input voltage.

3. The method according to claim 1, comprising:

supplying the LV onboard electrical subsystem (NVN) with power from the HV onboard electrical subsystem (HVN) by a plurality of DC-DC voltage converters.

4. The method according to claim 3, comprising:

exchanging a reference voltage between the plurality of DC-DC voltage converters on a data line.

5. The method according to claim 1, comprising:

computing the minimum input voltage in accordance with Vin,min=n·Vout,ref, where n is a turns ratio of the at least one DC-DC voltage converter, and Vout,ref is a reference control voltage on an output side of the at least one DC-DC voltage converter.

6. The method according to claim 1, comprising:

computing the power-adapted current saturation value in accordance with Iout,max=Pin/Vin,th·n, where Pin is a value of the input power, and Vin,th is the value of the auxiliary voltage.

7. The method according to claim 1, wherein the at least one DC-DC voltage converter is a synchronous rectifier.

8. The method according to claim 7, wherein the synchronous rectifier is a phase shifted full bridge DC-DC voltage converter.

9. The method according to claim 1, wherein the nominal voltage of the HV onboard electrical subsystem (HVN) is between 48 V and 1000 V.

10. The method according to claim 1, wherein the nominal voltage of the LV onboard electrical subsystem (NVN) is between 12 V and 60 V.

11. A vehicle comprising:

an onboard energy system (EBN) comprising:

a high-voltage (HV) onboard electrical subsystem (HVN);

a low-voltage (LV) onboard electrical subsystem (NVN); and at least one electrically isolated DC-DC voltage converter connected between the HV onboard electrical subsystem and the LV onboard electrical subsystem, wherein the at least one electrically isolated DC-DC voltage converter has an adjustable current saturation representing a maximum output current that the at least one electrically isolated DC-DC voltage converter can output to the low-voltage onboard electrical subsystem, wherein the vehicle is configured to:

stipulate an auxiliary voltage that lies between a nominal voltage of the HV onboard electrical subsystem and a predefined minimum input voltage;

ascertain an associated input power in response to an input voltage measured at an input of the at least one DC-DC voltage converter dropping below a value of the auxiliary voltage;

compute a power-adapted value of a current saturation for the maximum output current of the at least one DC-DC voltage converter on a basis of a previously ascertained input power, and set the computed power-adapted value of the current saturation for the maximum output current of the at least one electrically isolated DC-DC voltage converter instead of a standard value of the current saturation for the at least one electrically isolated DC-DC voltage converter; and reset the current saturation for the least one electrically isolated DC-DC voltage converter to the standard value in response to the input voltage again reaching the nominal voltage of the HV onboard electrical subsystem.

12. The vehicle according to claim 11, wherein the vehicle is an electric vehicle.

13. The vehicle according to claim 11, wherein the vehicle is configured to:

switch off the at least one DC-DC voltage converter in response to the input voltage dropping below the minimum input voltage; and switch on the at least one DC-DC voltage converter in response to the input voltage again reaching the minimum input voltage.

14. The vehicle according to claim 11, comprising:

a plurality of DC-DC voltage converters, wherein the vehicle is configured to:

supply the LV onboard electrical subsystem (NVN) with power from the HV onboard electrical subsystem (HVN) by the plurality of DC-DC voltage converters.

15. The vehicle according to claim 14, wherein the vehicle is configured to:

exchange a reference voltage between the plurality of DC-DC voltage converters on a data line.

16. The vehicle according to claim 11, wherein the vehicle is configured to:

compute the minimum input voltage in accordance with $V_{in,min}=n\cdot V_{out,ref}$, where n is a turns ratio of the at least one DC-DC voltage converter, and $V_{out,ref}$ is a reference control voltage on an output side of the at least one DC-DC voltage converter.

17. The vehicle according to claim 11, wherein the vehicle is configured to:

compute the power-adapted current saturation value in accordance with $I_{out,max}=P_{in}/V_{in,th}\cdot n$, where $P_{in}$ is a value of the input power, and $V_{in,th}$ is the value of the auxiliary voltage.

18. The vehicle according to claim 11, wherein the at least one DC-DC voltage converter is a synchronous rectifier.

19. The vehicle according to claim 18, wherein the synchronous rectifier is a phase shifted full bridge DC-DC voltage converter.

20. The vehicle according to claim 11, wherein the nominal voltage of the HV onboard electrical subsystem (HVN) is between 48 V and 1000 V, and wherein the nominal voltage of the LV onboard electrical subsystem (NVN) is between 12 V and 60 V.

* * * * *